US006993415B2

(12) United States Patent
Bauer et al.

(10) Patent No.: US 6,993,415 B2
(45) Date of Patent: Jan. 31, 2006

(54) DISTRIBUTED CONTROL SYSTEM FOR A WHIRLPOOL TUB

(75) Inventors: Ronald A. Bauer, Belgium, WI (US); Richard J. Hackl, Milwaukee, WI (US)

(73) Assignee: Kohler Co., Kohler, WI (US)

( * ) Notice: Subject to any disclaimer, the term of this patent is extended or adjusted under 35 U.S.C. 154(b) by 132 days.

(21) Appl. No.: 10/820,894

(22) Filed: Apr. 8, 2004

(65) Prior Publication Data

US 2005/0228544 A1 Oct. 13, 2005

(51) Int. Cl.
*G05D 7/00* (2006.01)

(52) U.S. Cl. ............................ 700/282; 700/2; 700/19; 700/83

(58) Field of Classification Search .................... 700/2, 700/3, 9, 17, 19, 83, 282; 4/541.1; 116/300
See application file for complete search history.

(56) References Cited

U.S. PATENT DOCUMENTS

| | | | | |
|---|---|---|---|---|
| 4,756,030 A | * | 7/1988 | Juliver | 4/668 |
| 5,136,496 A | | 8/1992 | Tsuboi | |
| 5,233,510 A | | 8/1993 | Brueckner et al. | |
| 5,361,215 A | * | 11/1994 | Tompkins et al. | 700/300 |
| 5,406,473 A | | 4/1995 | Yoshikura et al. | |
| 5,844,796 A | * | 12/1998 | Araki | 700/86 |
| 5,856,921 A | | 1/1999 | Kim et al. | |
| 5,927,398 A | | 7/1999 | Maciulewicz | |
| 5,984,498 A | | 11/1999 | Lem et al. | |
| 5,988,847 A | | 11/1999 | McLaughlin et al. | |
| 6,047,219 A | | 4/2000 | Eidson | |
| 6,339,726 B1 | | 1/2002 | Miyata et al. | |
| 6,405,103 B1 | | 6/2002 | Ryan et al. | |
| 6,498,965 B2 | * | 12/2002 | Matsumoto et al. | 700/231 |
| 6,873,876 B1 | * | 3/2005 | Aisa | 700/86 |
| 6,879,863 B2 | * | 4/2005 | Mueller et al. | 700/85 |
| 2002/0035404 A1 | | 3/2002 | Ficco et al. | |
| 2002/0069460 A1 | | 6/2002 | Huffington et al. | |
| 2002/0128729 A1 | | 9/2002 | Blair et al. | |
| 2002/0156837 A1 | | 10/2002 | Batke et al. | |
| 2002/0156838 A1 | | 10/2002 | Batke et al. | |

* cited by examiner

*Primary Examiner*—Leo Picard
*Assistant Examiner*—Alexander Kosowski
(74) *Attorney, Agent, or Firm*—George E. Haas; Quarles & Brady LLP

(57) ABSTRACT

A control system for plumbing equipment includes a user interface and a main controller. Only the user interface is customized and unique to a specific model of the plumbing equipment, and stores main software program that is tailored to operate the particular components of that specific model. The main controller is generic and is able to be used on several different models of the plumbing equipment. Upon activation of the control system the main software program is transferred to the main controller which configures the main controller to operate the specific model of the plumbing equipment.

10 Claims, 1 Drawing Sheet

FIG. 1
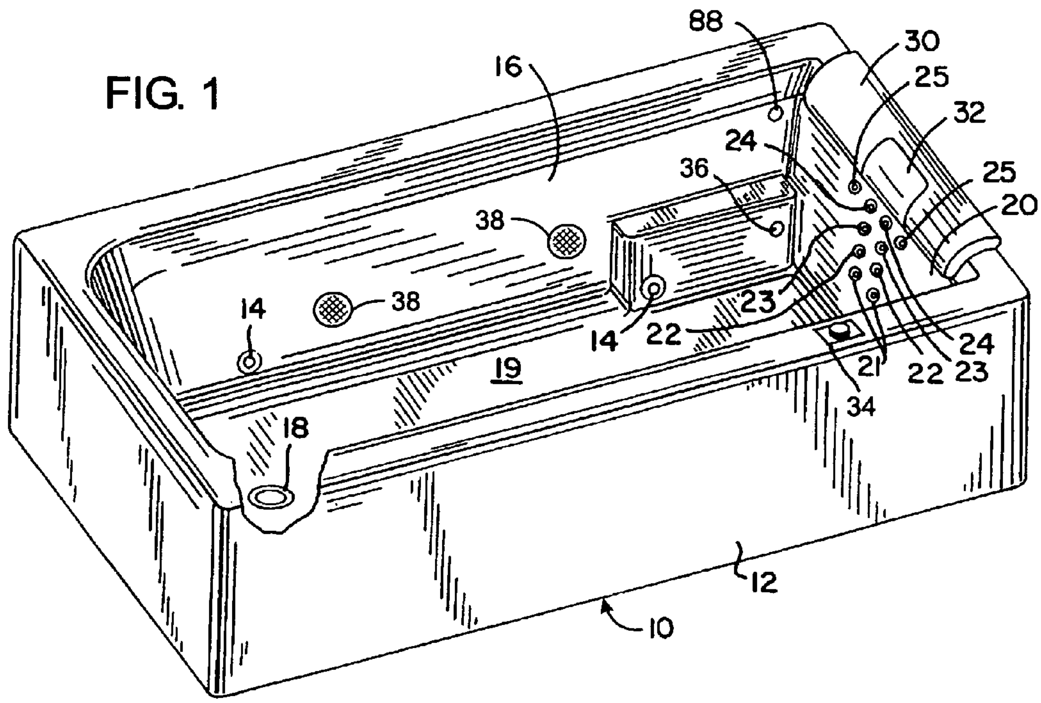
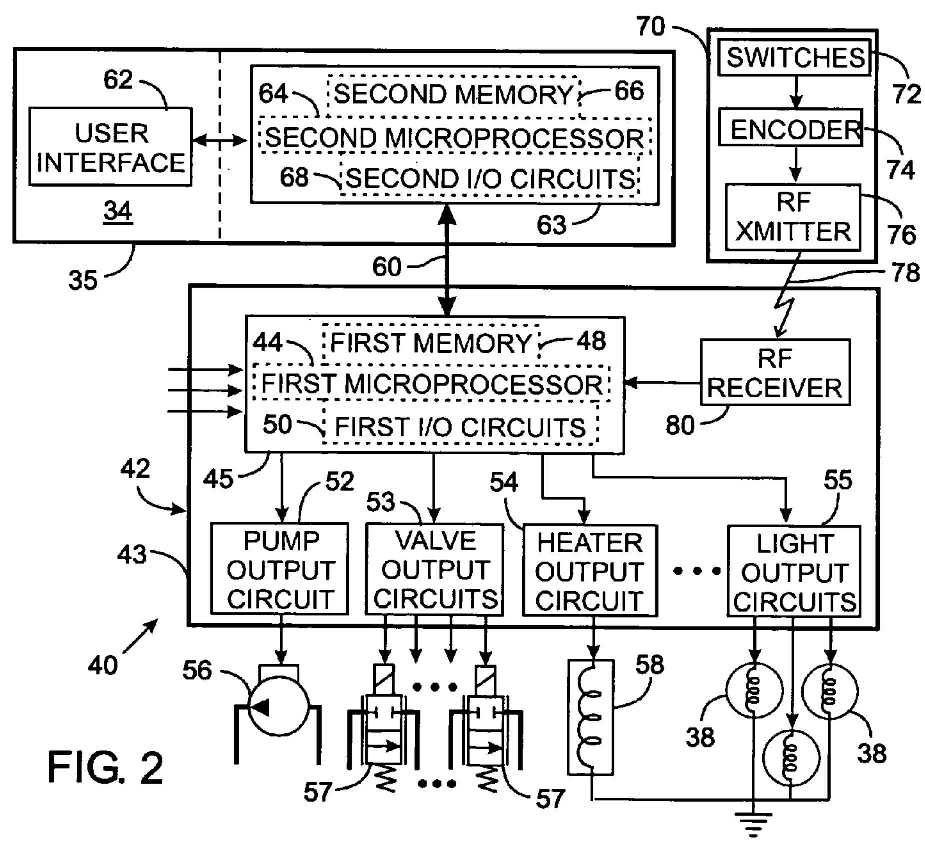
FIG. 2

DISTRIBUTED CONTROL SYSTEM FOR A WHIRLPOOL TUB

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to plumbing fixtures, such as spas and whirlpool tubs; and more particularly to control systems for operating the components of the spa or whirlpool tub.

2. Description of the Related Art

Hydro-massage spas and whirlpool tubs provide a therapeutic massaging action by delivering water through several nozzles in the tub walls to create a circulating flow of turbulent water. The tub water is drawn through a drain to a pump and then is forced outward through the nozzles to create jets of water in the tub. Air can be added to the circulating water at a controlled rate at each nozzle to increase the turbulence and massaging action of the water exiting the nozzles. Often each nozzle can be pivoted to direct its jet of water toward a desired area of the bather's body. Some nozzles even allow adjustment of the amount of water flow or the amount of air that is mixed with the water.

Valves are operated to create a pulsating water flow that provides a massaging effect replicating the rhythmic manipulation of tissue performed by a masseur or masseuse. The water flow can be fed sequentially through a series of jets to provide a progressive stimulation along the bather's spine which is particularly soothing to the back and neck of an individual.

To enhance the bathing experience underwater lamps can be controlled to produce light of varying intensity and color.

The typical manufacturer of whirlpool tubs produces a product line comprising a number of models starting with one having very basic functions and continuing to the top of the line model with the full range of functions. The top of the line model enables the bather to activate selected jets and define the flow pattern for different groups of jets.

Each whirlpool tub model has a controller to operate the various components, i.e. valves, pumps, heater, lights, etc., in response to signals from an operator control panel usually mounted on the rim of the tub. Because the different models have different combinations of components the controller and operator control panel must be unique to a particular model. This requires that a series of matched controllers and operator control panels be developed for the line of whirlpools. It is desirable to use common components as much as possible on the different whirlpool models as that reduces the number of different components which have to be designed and manufactured.

SUMMARY OF THE INVENTION

A control system for a plumbing fixture, such as a whirlpool tub, that has a plurality of components which are electrically operated, comprises a main controller and an input controller. The main controller includes a first microprocessor, a first memory connected to the first microprocessor, and a plurality of outputs coupling the first microprocessor to the plurality of components on the plumbing fixture. The input controller comprises an input device by which a plumbing fixture user is able to enter commands for selectively operating the plurality of components. The input device is connected to an input controller that includes a second microprocessor which is connected to a second memory. The second memory stores a first software program for execution by the second microprocessor to process the commands from the input device, and also stores a second software program for execution by the first microprocessor to control the plurality of components. A transfer mechanism is provided to convey the second software program from the first memory to the second memory upon activation of the control system.

This configuration of the control system enables only the input controller of the control circuit to be unique for a particular whirlpool model. Only that subassembly contains the devices and software which are customized to a particular whirlpool model. The circuitry of the main controller and the software permanently stored therein are generic and suitable for controlling any of the plurality of whirlpool models.

BRIEF DESCRIPTION OF THE DRAWINGS

FIG. 1 is an isometric view of a whirlpool that incorporates the present invention; and FIG. 2 is a schematic block diagram of a control circuit in the whirlpool.

DETAILED DESCRIPTION OF THE INVENTION

With reference to FIG. 1, a hydro-massage whirlpool 10 includes a tub 12 having a plurality of conventional whirlpool nozzles 14 projecting through an interior side wall 16. The tub floor has a standard drain opening 18. One end of the tub has an end wall 20 with a plurality of nozzles 21, 22, 23, 24 and 25 that are positioned in pairs. Four of the nozzles pairs 21, 22, 23 and 24 are arranged above one another and the fifth pair of nozzles 25 is located horizontally on either side of the fourth pair of nozzles 24. As will be described, the flow of water through each pair of nozzles 21–25 is controlled by a separate valve so that its flow may regulated independently of the other nozzle pairs.

A soft cushion 30 is attached to the rim of the tub end wall 20. The cushion 30 is formed of a outer covering of a vinyl material with a soft filler inside. The cushion 30 has a central cut out section in which a separate removable pillow 32 is located. The pillow 32 has a U-shaped inner pad of resilient material that conforms to the bather's neck. The pad is covered by a porous fabric membrane to form a rectangular shaped pillow that permits streams of water to pass there through from jets located beneath the pillow. Additional valves independently control the flow of water through the pillow in a pulsating or continuous manner to massage the bather's neck.

A control panel 34 is mounted on the rim of tub 12 and is part of a control circuit 40 shown in FIG. 2. Alternatively for whirlpools that mount in an aperture in a bathing deck, the control panel 34 can be located on that deck adjacent the whirlpool. The control panel 34 more particularly is part of an input controller 35 which is electrically coupled to a main controller 42 located remote from the control panel 34 in a separate housing 43 underneath the tub adjacent the valves, pump, and other electrically operated whirlpool components. The control panel 34 is used by the bather to select various functions and components of the whirlpool 10 to activate and that selection is communicated to the main controller 42 which controls operation of those components.

The main controller 42 contains a first microcomputer 45 that has a first microprocessor 44 which executes software programs stored within a non-volatile first memory 48. The first memory 48 also stores data used by those programs. First input/output (I/O) circuits 50 interface sensors, such as a water level sensor 36 mounted in the tub side wall 16 in FIG. 1, and other input devices to first microprocessor 44. The execution of the software program by the first microprocessor 44 produces output signals which are processed by a set of output circuits 52–55 to drive components of the whirlpool 10. One of those output signals is processed by a pump output circuit 52 to control the pump 56 of the whirlpool. A group of other output signals is applied to a set of circuits 53 which operate the valves 57 that control the flow of water through the whirlpool jets. Another output signal from the first microprocessor 44 is applied to a heater control circuit 54, which controls the heater for the whirlpool tub. Other types of output circuits can be provided, such as light control circuit 55 which receives output signals to govern the operation of the lights 38 within the whirlpool.

The main controller 42 processes control commands from the input controller 35 via a communication line 60. The input controller 35 comprises a user interface 62 on the input panel 34 by which the bather selects different functions to be activated and the intensity or other parameters of the selected function. The user interface 62 provides input commands to a second microcomputer 63 which has a second microprocessor 64, which executes a program stored within a non-volatile second memory 66 that governs the operation of the input controller 35. The second microcomputer 63 includes second I/O circuits 68 which interface the second microprocessor 64 to the user interface 62 and the communication line 60. The second microprocessor 64 responds to the input commands from the user interface 62 by generating control commands which are sent via the communication line 60 to the main controller 42. The control commands are relayed to the first microprocessor 44.

The main controller 42 also receives operator provided input signals directly from a wireless remote control 70 that is similar to such devices commonly used with consumer electronic equipment. The wireless remote control 70 has a plurality of switches 72 for the various whirlpool functions. The switches 72 are connected to an encoder 74 that produces a control command indicating which of the switches has been activated by the bather. That control command is modulated onto a radio frequency (RF) carrier by a transmitter 76 which produces and transmits a remote control signal 78. The remote control signal 78 is detected by an RF receiver 80 in the main controller 42 which recovers and applies the control command to an input of the first microprocessor 44.

The main controller 42 is generic to a plurality of different whirlpool models having various combinations of features, functions and components 38, 56–58. The first memory 48 on the main controller 42 permanently stores routines for driving and operating all the different components that are used on any of those various whirlpool models. Specifically, the first memory contains software drivers for the different types of pumps, valves, heaters, lights and other devices. Thus, regardless of into which specific whirlpool model the generic main controller 42 is incorporated, it has all of the software routines for driving the specific output devices employed in that model. Similarly, the first memory 48 permanently stores the software routines for processing the input signals received by the first I/O circuits 50 from the sensors, input controller 35, and the RF receiver 80. The various input, output and communication routines stored within the memory are generic, being used in a number of different models of whirlpools in which the main controller 42 can be incorporated.

In contrast to the generic main controller 42, the input controller 35 is unique to a specific whirlpool model. In other words, the user interface 62 and other components of the input controller 35 are configured for only the functions utilized in one particular model. The second memory 66 contains the software for processing the signals from the user interface 62 into specific control commands for the available whirlpool functions. Therefore a separate version of the input controller 35 is created for each different whirlpool model.

The second memory 66 of the input controller 35 also contains the software program for execution by the first microprocessor 44 on the main controller 42. This control program also is unique to the particular model of whirlpool tub, as it must be specifically configured to operate the functions and components that are provided in that particular model. Upon the activation of the control circuit 40, the main controller software program stored within the second memory 66 is transferred from the input controller 35 to the first memory 48 on the main controller 42. That transfer is carried out by the second microprocessor 64, sequentially accessing each storage location within the second memory 66 and reading out the corresponding program instruction. Those program instructions are transmitted via communication line 60 to the first microprocessor 44 which sequentially stores the instructions a section of the first memory 48 in the main controller 42. The activation of the control circuit 40, which triggers the transfer of the software program, may be the application of electrical power from the building circuits to the whirlpool 10, activation of a main power button on the input panel 34 by a bather, or some other event which occurs at the commencement of whirlpool use.

This transfer of the software stored within the second memory 66 configures the main controller 42 for the particular whirlpool model. As a consequence, only the input controller 35 of the control circuit 40 has to be unique for a particular whirlpool model. The circuitry of the main controller 42 and the software permanently stored therein are generic and suitable for controlling any of the plurality of whirlpool models. However, it will be understood that if a particular whirlpool model does not have a specific component, such as the heater 58, the corresponding output line from the output control circuits 52–55 will be unconnected. This greatly simplifies fabrication of the whirlpool control circuit and reduces the number of different parts which must be manufactured and maintained in inventory.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A control system for a plumbing fixture that has a plurality of components which are electrically operated, the control system comprising:

a main controller with a first microprocessor, a first memory connected to the first microprocessor, and a plurality of outputs coupling the first microprocessor to the plurality of components;

an input controller with an input device by which a user of the plumbing fixture is able to enter commands for selectively operating the plurality of components, the input device connected to a second microprocessor which is connected to a second memory containing a first software program for execution by the second microprocessor to process the commands from the input device, the second memory also containing a second software program for execution by the first microprocessor to operate the plurality of components, and a transfer mechanism to convey the second software program from the second memory to the first memory upon activation of the control system.

2. The control system as recited in claim 1 wherein the transfer mechanism conveys the second software program from the first memory to the second memory upon application of electrical power to the control system.

3. The control system as recited in claim 1 wherein the transfer mechanism conveys the second software program from the first memory to the second memory upon operation of the input device by the user.

4. The control system as recited in claim 1 wherein the first memory is a non-volatile memory device.

5. The control system as recited in claim 1 wherein the second memory permanently contains software routines for operating the plurality of components.

6. The control system as recited in claim 1 wherein the main controller is generic for controlling a plurality of models of plumbing fixtures having different pluralities of components; and the input controller is unique to one of the plurality of models of plumbing fixtures and the second software program is unique for controlling only those components on the one of the plurality of models of plumbing fixtures.

7. The control system as recited in claim 1 wherein the main controller is located in a housing that is separate and remote from the input controller.

8. A method for controlling a whirlpool tub that has a plurality of components which are electrically operated, the method comprising:

providing a main controller that has a first microprocessor, a first memory connected to the first microprocessor, and a plurality of outputs coupling the first microprocessor to the plurality of components;

providing an input controller that has an input device by which a user of the whirlpool tub is able to enter input commands for selectively operating the plurality of components, the input device connected to a second microprocessor which is connected to a second memory;

storing a first software program and a second software program into the second memory;

upon activation of the control system, transferring the second software program from the second memory to the first memory;

executing the first software program by the second microprocessor to process the input commands from the input device and transmit control commands to the main controller; and executing the second software program by the first microprocessor to control the plurality of components in response to the control commands.

9. The method as recited in claim 8 wherein activation of the control system comprises applying of electrical power to the control system.

10. The method as recited in claim 8 wherein activation of the control system comprises operation of the input device by the user.

* * * * *